United States Patent [19]

Caray

[11] 4,366,888
[45] Jan. 4, 1983

[54] DIAPHRAGM CLUTCH MECHANISM

[75] Inventor: André Caray, Paris, France

[73] Assignee: Valeo Societe Anonyme, Paris, France

[21] Appl. No.: 203,726

[22] Filed: Nov. 3, 1980

[30] Foreign Application Priority Data

Nov. 6, 1979 [FR] France .................. 79 27276

[51] Int. Cl.³ ............................................ F16D 13/44
[52] U.S. Cl. ................................................ 192/89 B
[58] Field of Search .............. 192/89 B, 109 R, 99 S, 192/109 A, 70.28, 98, 70.3

[56] References Cited

U.S. PATENT DOCUMENTS 4,084,674  4/1978  De Gennes ................. 192/89 B
4,273,228  1/1981  Huber ......................... 192/89 B

FOREIGN PATENT DOCUMENTS 2843337  4/1980  Fed. Rep. of Germany .... 192/89 B
1482768  8/1977  United Kingdom .

Primary Examiner—George H. Krizmanich
Attorney, Agent, or Firm—Charles A. Brown

[57] ABSTRACT

This relates to a diaphragm clutch mechanism comprising a cover, and a diaphragm spring connected to the cover for rocking movement with respect thereto. A pivot ring is provided as a support for the diaphragm spring, and this ring is anchored, at its internal periphery, between a bent-back part of the lugs fixing the diaphragm spring in a pivoting manner to the clutch cover, and a shoulder formed on the axial part of these lugs. This shoulder is in contact with only one of the axial edges of the axial part of the respective lug, so that the other axial edge of the axial part is substantially rectilinear.

6 Claims, 11 Drawing Figures

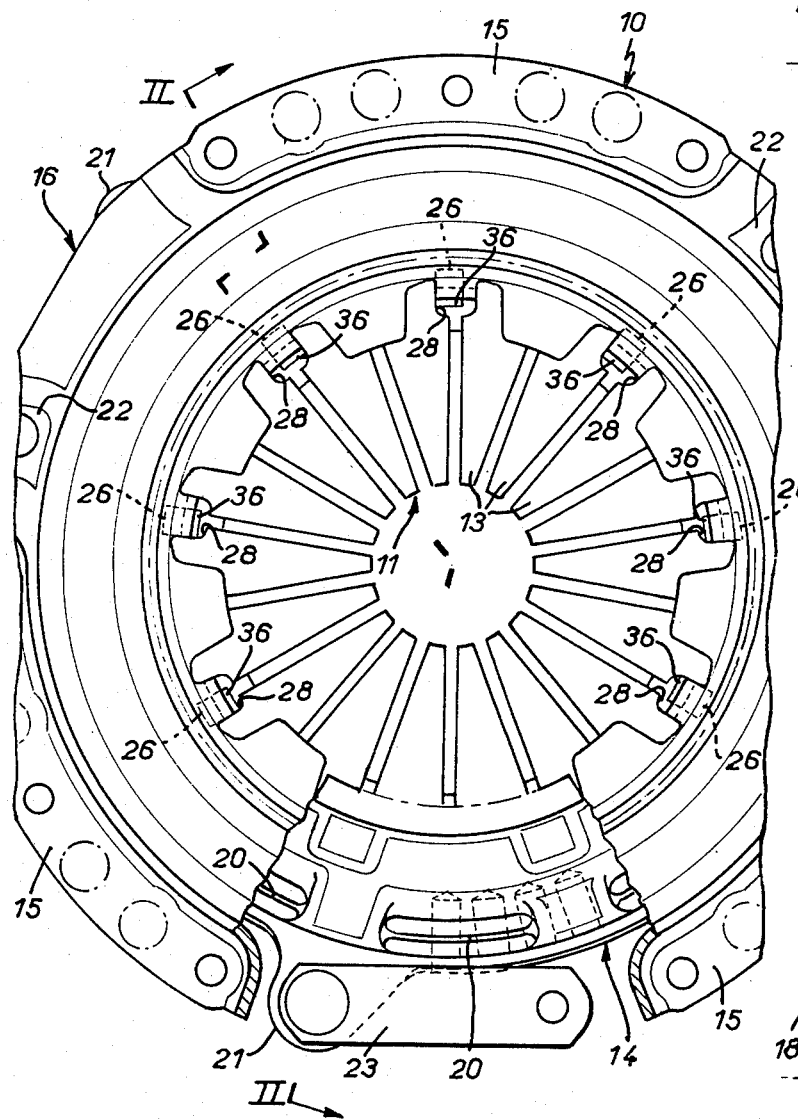
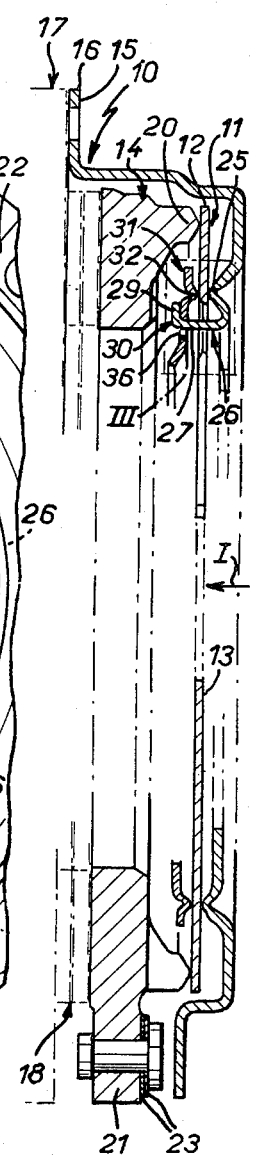
FIG.1
FIG.2

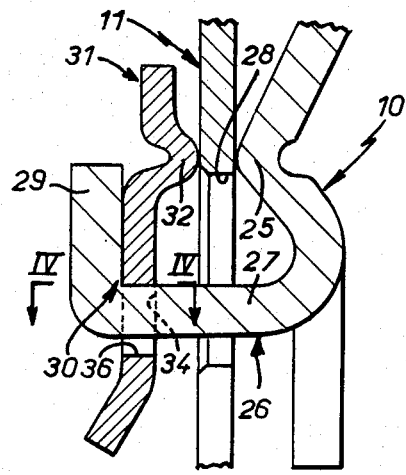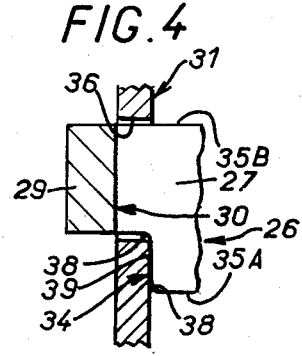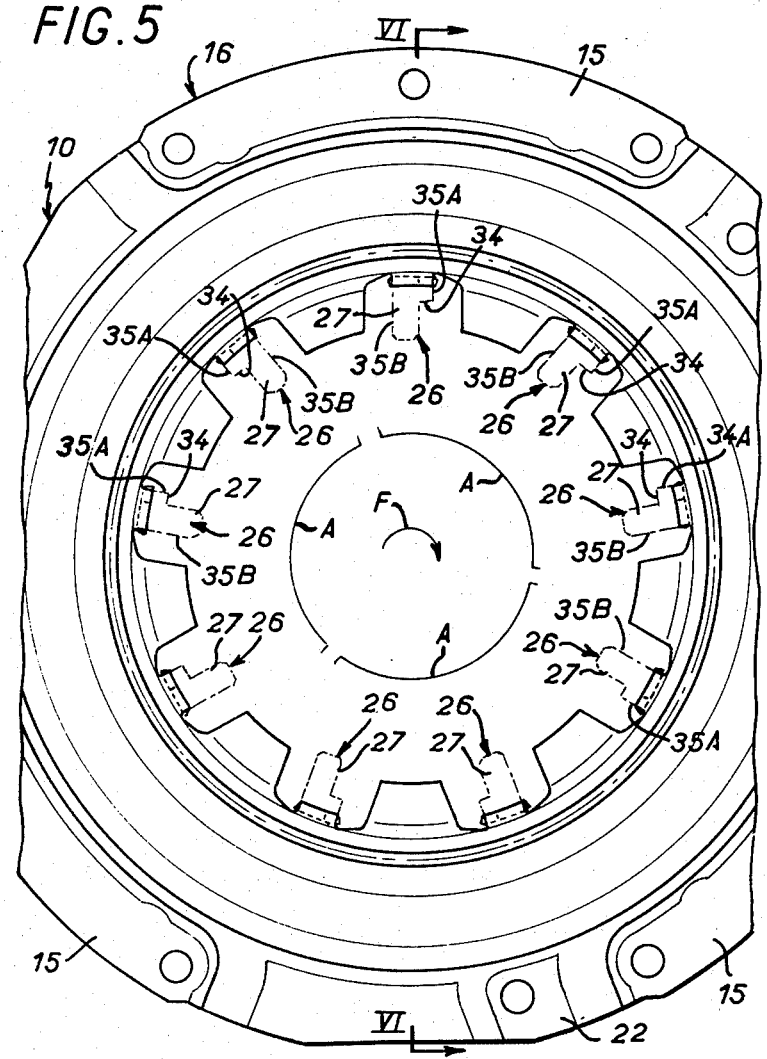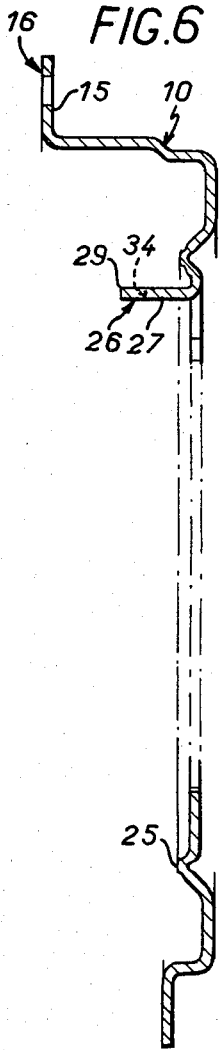

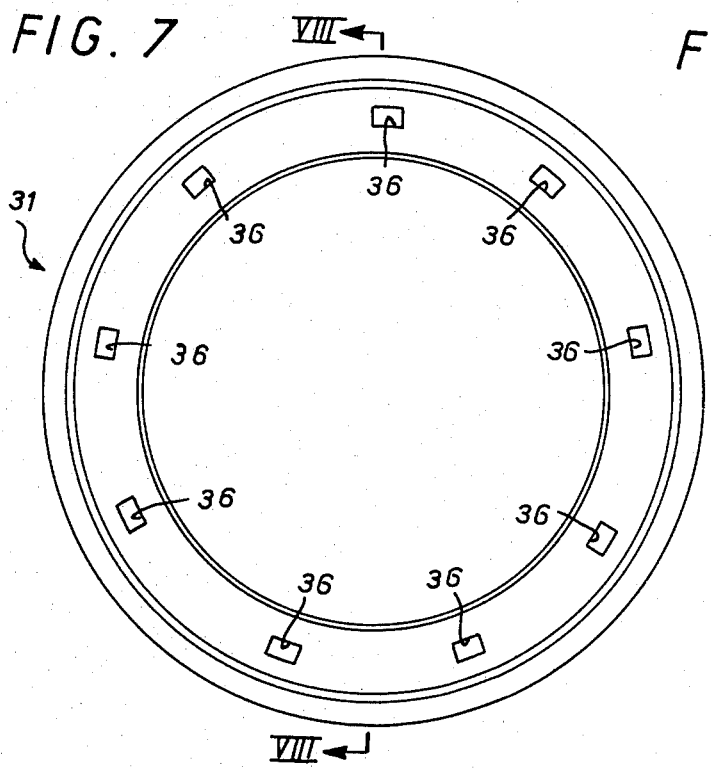
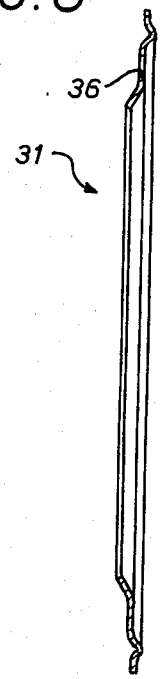
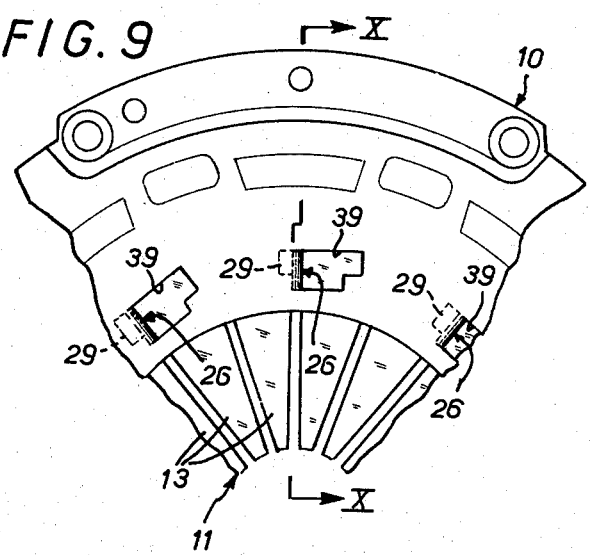
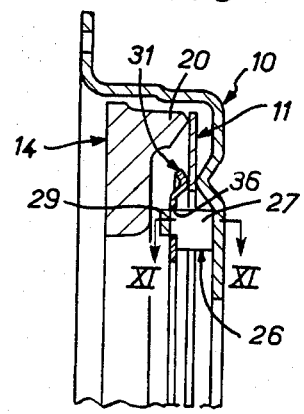
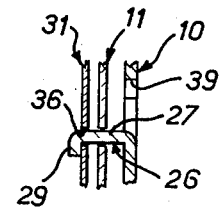

DIAPHRAGM CLUTCH MECHANISM

BACKGROUND OF THE INVENTION

The present invention relates generally to a diaphragm clutch mechanism, in particular for a motor vehicle, of the kind comprising a first substantially annular part comprising a cover, a second substantially annular part comprising a diaphragm spring, which has a peripheral part forming a cup spring and a central part divided into radial fingers, connecting means fixing the diaphragm spring to the cover for pivotal movement with respect thereto, and a third annular part comprising a pressure plate which is connected to the cover for rotation with the cover whilst at the same time being axially movable relative thereto, and on which the diaphragm spring bears by means of its peripheral cup spring part.

By means of its cover, a clutch mechanism of this kind can be attached to a reaction plate or flywheel, which is connected with a first shaft (usually a driving shaft) for rotation therewith with the interposition between this reaction plate and the pressure plate of a friction disc which is connected for rotation with a second shaft (usually a driven shaft). A clutch bearing is generally arranged around the driven shaft and is capable of acting on the radial fingers of the diaphragm spring in order to release the clutch, which is normally engaged. In this normal condition the pressure plate clamps the friction disc against the reaction plate under the action of the peripheral cup spring part.

The present invention relates more particularly to clutch mechanisms of this kind in which the connecting means fixing the diaphragm spring to the cover for pivoting movement comprise, on the one hand, flat, thin lugs which are integral with the cover, on which bear on the cover, and which pass, by means of an axial part, through openings provided in the diaphragm spring in the region of the base of the radial fingers spring, and which define an axial retaining bend on the other side of this diaphragm, and, on the other hand, a pivot ring which is interposed between the axial retaining bend and the peripheral part of the diaphragm spring, and which is anchored between this axial retaining bend and a transverse shoulder of the axial part of the lugs, forming a flange on the axial part.

A clutch mechanism of this type is described in U.S. Patent Application Ser. No. 160,460 filed June 18, 1980.

In the construction described in this prior U.S. application, the shoulder of the axial part of each lug, on which shoulder the retaining ring bears axially for its anchorage, is in contact with both of the axial edges of the axial part of this lug and is equally distributed over both of these axial edges.

Although this arrangement can be satisfactory, it has the following disadvantages.

Firstly, circumferentially, the axial part of each lug necessarily has only a limited extension, with the result that the division, into two portions, of the transverse shoulder which this axial part possesses for the anchorage of the pivot ring accordingly reduces, circumferentially, the individual extension of each of these shoulder portions, or, in other words, leads to shoulder portions which each individually possess, circumferentially, a very reduced extension.

Now, the stamping-out of the initial blank leading to the formation of these lugs results in the presence of round-offs or hollows at each of the ends of the shoulder portions which the axial part of this lug possesses.

These round-offs or hollows inevitably encroach on the length of material available for the formation of this shoulder portion, with the result that the rectilinear part, which can therefore have this shoulder portion between its two end round-offs, is extremely reduced or even non-existent.

Consequently, the zone in which the pivot ring bears on this shoulder portion is poorly defined and is difficult to control.

Thus, the anchoring contact of the pivot ring with the shoulders of the axial lugs used to fix it to the cover may not be satisfactory, to the detriment of the working conditions of this pivot ring.

Moreover, difficulties appear when the various components required to build up the clutch mechanism are stacked together. These difficulties essentially involve the engagement of the diaphragm spring on the lugs intended for fixing it to the cover.

In fact, because the axial part of these lugs has, on each of its axial edges, a shoulder portion for the bearing of the retaining ring, the diaphragm, it it is not presented correctly (the tolerances in this respect being very low), can be stopped prematurely by one or other of the shoulder portions of one or other of these lugs, in particular in the case where the stacking is carried out by means of an automatic machine.

However, these difficulties also involve the pivot ring, albeit to a much less serious extent.

In fact, because of the narrowness of each of the shoulder portions of the axial part of the lugs on which it is to bear, the tolerances for engagement of this pivot ring on these lugs are also extremely low.

The present invention relates in general terms to an arrangement which makes it possible to avoid these disadvantages.

SUMMARY

More precisely, the invention provides a diaphragm clutch mechanism of the kind described, in which, for each lug, the shoulder on which the pivot ring bears axially for its anchorage is in contact with only one of the axial edges of the axial part of this lug, so that the other axial edge of the latter is substantially rectilinear.

By virtue of this arrangement, since the transverse shoulder which the axial part of a lug must have for the bearing of the retaining ring is concentrated continuously over only one of the axial edges of the part, and thus benefits by itself from all the space available for its formation, it advantageously has a circumferential extension which is sufficient for the shoulder, at least in its central part, to form a rectilinear area suitable for well-defined and well-controlled contact with the retaining ring.

Moreover, the tolerances for engagement of the latter on the lugs in question can thus be less strict.

Furthermore, according to the invention, for at least two of these lugs, the rectilinear axial edges of the axial part of the latter are preferably alternated, in a circular direction, from one of the lugs to the other.

Thus, when it is engaged in these lugs, the diaphragm spring is correctly guided by rectilinear edges of the lugs, both on a first side of these lugs, in a circular direction, and on the opposite side of the latter, without the risk of being stopped on any one of the shoulders or shoulder portions of these lugs.

BRIEF DESCRIPTION OF THE DRAWINGS

FIG. 1 is a partial view in elevation, looking in the direction of the arrow I in FIG. 2, with a local cut-away portion, of a diaphragm clutch mechanism;

FIG. 2 is a view in axial section taken along the section line II—II in FIG. 1;

FIG. 3 shows, on a larger scale, the detail of FIG. 2 which is identified by an inset III on the latter;

FIG. 4 is a partial view in section taken along the line IV—IV in FIG. 3;

FIG. 5 is a partial view in elevation, showing only the cover used in this clutch mechanism;

FIG. 6 is a view in axial section of this cover, taken along the line IV—VI in FIG. 5, showing the formation of an axial retaining bend on the lugs incorporated by the cover;

FIG. 7 is a view in elevation, showing only the pivot ring used in the clutch mechanism;

FIG. 8 is a view in axial section taken along the line VIII—VIII in FIG. 7;

FIGS. 9 and 10 are partial views respectively equivalent to those of FIGS. 1 and 2, but relating to a modified embodiment; and FIG. 11 is a partial view in section of this modified embodiment, taken along the line XI—XI in FIG. 10.

DETAILED DESCRIPTION OF THE PREFERRED EMBODIMENTS

Referring to FIGS. 1 to 8, these show a diaphragm clutch mechanism comprising a cover 10, a diaphragm spring 11, which has a peripheral part 12 forming a cup spring and a central part divided up into radial fingers 13, connecting means, described in detail below, fixing the diaphragm spring 11 to the cover 10 for pivoting or rocking movement with respect thereto, and a pressure plate 14, which is connected rotation with the cover 10 whilst at the same time being axially movable relative thereto, as specified below, and on which the diaphragm spring 11 bears by means of its peripheral part 12 which forms the cup spring.

By means of areas 15 provided on a peripheral radial flange 16, the cover 10 can be attached to a plate 17, comprising a reaction plate or flywheel, which is shown schematically in broken lines in FIG. 2 and which is connected for rotation with a driving shaft (not shown), with the interposition between this reaction plate 17 and the pressure plate 14, of a friction disc 18 which is also shown schematically in broken lines in FIG. 2 and which is connected for rotation with a driven shaft (not shown).

For the action of the diaphragm 11, the pressure plate 14 possesses, at various points, axial bosses 20 on which the peripheral cup spring part 12 of this diaphragm spring 11 bears.

Peripherally, the pressure plate 14 is formed at various points with radially projecting lugs 21; tongues 23, which connect it for rotation with this cover 10 whilst at the same time permitting axial displacement, extend, approximately tangentially to a circumference of the whole assembly, between the lugs and areas 22 of the peripheral flange 16 of the cover 10.

These arrangements are in themselves well known and, since they do not form part of the present invention, they will not be described in further detail in this text.

The cover 10 provides a first or primary, support for the diaphragm spring 11, and more precisely for the peripheral cup spring part 12 on the internal periphery of this peripheral part, and, in the embodiment shown, it possesses an annular half-wave deformation for this purpose, which forms a first bearing ring 25.

The connecting means fixing the diaphragm spring 11 in a pivoting or rocking manner to this cover 10 comprise, on the one hand, flat and thin lugs 26, of which there are nine in the embodiment shown, and which are integral with the cover 10, and which pass, by means of an axial part 27, through openings 28 provided in the diaphragm 11 in the region of the base of the radial fingers 13.

In the embodiment shown, these lugs 26 originate from the cover 10 and therefore form an integral part of the latter, and, since their base bending line extends approximately tangentially relative to a circumference of the whole arrangement, their axial part 27 is radially relatively thin and circumferentially relatively elongate.

On the other side of the diaphragm 11, the lugs 26 define an axial retaining bend 30; in the embodiment shown, the latter is defined, on the one hand, by the axial part of the lugs 26, and, on the other hand, by a part 29 of the latter, which is bent back, substantially radially, in the direction away from the axis of the whole arrangement.

A pivot ring 31, which provides a second or secondary support for the diaphragm spring 11, is interposed between this axial retaining bend 30 and the peripheral cup spring part 12 of the diaphragm spring 11.

For this purpose, the pivot ring has, at right angles to the ring 25 of the cover 10, an annular half-wave deformation forming a second bearing ring 32 in contact with the peripheral part 12.

As described in U.S. Patent Application Ser. No. 160,460, the pivot ring 31 is anchored between, on the one hand, the axial retaining bend 30 of the lugs 26, and, on the other hand, a transverse shoulder 34 with which the axial part 27 of each lug 26 is provided.

For each lug 26, the shoulder 34 is in contact, in this case, with only one of the axial edges, namely 35A, of the axial part 27 of the respective lug 26, so that the other axial edge, namely 35B of the axial part is substantially rectilinear as can be seen in FIG. 5, in which the lugs 26 are shown flat in broken lines and bent in solid lines.

Furthermore, for at least two lugs 26, the rectilinear axial edges 35B of the axial part of the latter are alternated, in a circular direction, from one of the lugs 26 to the other.

In other words, for this pair of lugs, taking a circular direction of observation as indicated by the arrow F in FIG. 5, the rectilinear axial edge 35B is, in a circular direction, downstream for one of these lugs, whilst it is upstream for the other of these lugs, this rectilinear edge thus being, in a circular direction, on one side of the said lugs in the case of one of the lugs and on the other side of these lugs in the case of the other lug.

In practice, with the number of lugs 26 being a multiple of three, as in this case, there are twice as many lugs 26 for which the rectilinear edge 35B of the axial part 27 is on a first side, in a circular direction, as there are lugs 26 for which this rectilinear edge 35B is on the other side.

In addition, in practice and as shown in FIG. 5, there is a cyclic distribution of groups A of three successive lugs, which groups are formed of two successive lugs 26 for which the rectilinear edge 35B is on a first side, in a circular direction, and upstream according to the direction of observation F in the embodiment shown, and of a third lug 26 for which this rectilinear edge 35B is on the other side, in a circular direction, and downstream for the said direction of observation F in the embodiment shown; thus, at 120°, there are lugs 26 for which the rectilinear edges 35B of the axial part 27 are all on one and the same side, in a circular direction.

The diaphragm clutch mechanism made up in this way is assembled by successively stacking the diaphragm spring 11 and the pivot ring 31 on the lugs 26 of the cover 10, bending the part 29 of the said lugs, and rendering the tongues 23 integral with the cover 10 and the pressure plate 14.

When it is engaged on the lugs 26 of the cover 10, the diaphragm spring 11 is advantageously guided axially by means of the rectilinear edges 35B of the axial part 27 of these lugs, both in a circular direction, on a first side of these lugs, and on the other side.

It is thus prevented from coming into abutment, and therefore of being stopped prematurely, on the transverse shoulder 34 which the axial part 27 of the lugs 26 possesses.

Moreover, when it engages on these lugs 26, the pivot ring 31, which for this purpose has, according to an analogous distribution to that of these lugs 26, as shown in FIG. 7, passages 36 which are substantially complementary to the cross-section of the bent-back part 29 of these lugs 26, can equally well be presented in any one of three different angular positions because of the cyclic distribution specified above for the shoulder edges or the rectilinear edges of the axial part 27 of the lugs 26.

When this engagement is complete, the pivot ring advantageously finds a well-defined and well-controlled bearing on the shoulder 34 of these lugs 26.

In fact, each of these shoulders can easily possess a plane median part 39, as shown in FIG. 4, between its end round-offs 38 inherent in its manufacturing process.

In the modified embodiment illustrated by FIGS. 9 to 11, the base bending line of the lugs 26 of the cover 10 extends approximately radially, so that the axial part 27 of the lugs is circumferentially relatively thin and radially relatively elongate, and so that their part 29 is bent back approximately circumferentially.

In this modified embodiment, the lugs 26 are formed by means of cut-out parts 39 in the cover 10.

The present invention is not limited to the embodiments which have been described and shown, but encompasses any modified embodiment within the scope of the appended claims.

In particular, the lugs 26 can consist of elements independent of the cover 10, these elements simply bearing axially on the latter, either individually or in groups, as described, for example, in U.S. Pat. No. 4,084,674 in particular with reference to FIG. 13, of that patent.

Moreover, the field of application of the invention is not limited to the case where, as described, the diaphragm clutch mechanism in question forms, by itself, an isolated unit which is to be mounted substantially in its entirety on a reaction plate 17; on the contrary, it equally well covers the case where this clutch mechanism is considered as already mounted on this reaction plate, the whole arrangement constituting a diaphragm clutch, regardless of the method of assembly adopted for the various constituent elements of this diaphragm clutch.

Finally, the field of application of the invention equally well covers the case where as described in the above mentioned U.S. Patent Application Ser. No. 160,460, the diaphragm spring is allowed a slight play between its primary and secondary supports, in addition to the case where the pivot ring applies this diaphragm elastically against the cover under all circumstances and this play never arises.

I claim:

1. A diaphragm clutch cover assembly, comprising a substantially annular cover member, a substantially annular diaphragm spring having a cup spring outer peripheral part and a central part divided into radial fingers, connecting means for mounting said diaphragm spring for pivotal movement on said cover member, an annular pressure plate fixed for rotation with said cover member and axially movable relative thereto, said diaphragm spring outer peripheral part bearing against said pressure plate, said connecting means comprising (a) a plurality of relatively thin, flat lugs extending from said cover member, each of said lugs having an axial part passing through an opening in said diaphragm spring in the region of radially outer ends of said radial fingers, each of said axial parts having two spaced apart axial edges, each of said lugs defines an axially retaining bend on the side of said diaphragm spring remote from said cover member, and (b) pivot ring interposed between said axially retaining bend and said diaphragm spring peripheral part, said pivot ring being anchored between said axially retaining bend and a transverse shoulder formed on the axial parts of said lugs, said transverse shoulders being provided on only one of said axial edges of each of said axial lugs, the other axial edge of each of said lugs being substantially rectilinear.

2. The cover assembly of claim 1, wherein said one axial edge and said other axial edge of two said lugs are on circumferentially different sides of their respective axial parts.

3. The cover assembly of claim 2, wherein the number of said lugs is a multiple of three, and there are twice as many lugs in which said rectilinear edge of said axial part is on a first circumferential side than in which said rectilinear edge of said axial part is on a second circumferential side.

4. The cover assembly of claim 3, wherein there is at least one group of three said lugs, consisting of two successive lugs in which said rectilinear edge on a first circumferential side and a third lug in which said rectilinear side is on a second circumferential side.

5. The cover assembly of claim 1, wherein said three lugs are mutually spaced at 120° intervals, and have their rectilinear edges along the same circumferential side of their respective axial parts.

6. A diaphragm clutch comprising a substantially annular cover member, a substantially annular diaphragm spring having a cup spring outer peripheral part and a central part divided into radial fingers, connecting means for mounting said diaphragm spring for pivotal movement on said cover member, an annular pressure plate fixed for rotation with said cover member and axially movable relative thereto, said cover member being fixed to a reaction plate, and a clutch plate disposed between said pressure plate and said reaction plate, said reaction plate being connectable to a first shaft and said clutch plate being connectable to a second shaft, said diaphragm spring outer peripheral part bearing against said pressure plate, said connecting means comprising (a) plurality of relatively thin, flat lugs extending from said cover member, each of said lugs having an axial part passing through an opening in said diaphragm spring in the region of radially outer ends of said radial fingers, each of said axial parts having two spaced apart axial edges, each of said lugs defines an axially retaining bend on the side of said diaphragm spring remote from said cover member, and (b) a pivot ring interposed between said axially retaining bend and a transverse shoulder formed on the axial parts of said lugs, said transverse shoulders being provided on only one of said axial edges of each of said axial lugs, the other axial edge of each of said lugs being substantially rectilinear.

* * * * *